(12) United States Patent
Ikeda et al.

(10) Patent No.: US 11,515,559 B2
(45) Date of Patent: Nov. 29, 2022

(54) FUEL CELL SYSTEM

(71) Applicant: HONDA MOTOR CO., LTD., Tokyo (JP)

(72) Inventors: Yuta Ikeda, Wako (JP); Norihisa Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 332 days.

(21) Appl. No.: 16/780,932

(22) Filed: Feb. 4, 2020

(65) Prior Publication Data
US 2020/0259201 A1 Aug. 13, 2020

(30) Foreign Application Priority Data
Feb. 7, 2019 (JP) .............................. JP2019-020373

(51) Int. Cl.
*H01M 8/2475* (2016.01)

(52) U.S. Cl.
CPC ................................. *H01M 8/2475* (2013.01)

(58) Field of Classification Search
CPC ............. H01M 8/2475; H01M 8/2483; H01M 8/1004; H01M 8/0273; H01M 8/0276; Y02E 60/50
See application file for complete search history.

(56) References Cited

U.S. PATENT DOCUMENTS

| 2004/0142228 A1 | 7/2004 | Komura et al. |
| 2008/0182151 A1* | 7/2008 | Mizusaki ............ H01M 8/2475 429/457 |

FOREIGN PATENT DOCUMENTS

| JP | 4174025 | | 8/2004 | |
| JP | 2007128752 A | * | 5/2007 | |
| JP | 2009004266 A | * | 1/2009 | ............ H01M 8/247 |
| JP | 2014150003 A | * | 8/2014 | |

* cited by examiner

*Primary Examiner* — Muhammad S Siddiquee
(74) *Attorney, Agent, or Firm* — Amin, Turocy & Watson, LLP

(57) ABSTRACT

A first power output unit connected to a first terminal plate of a fuel cell system is electrically connected to a first external connector through a first joint part at a position above a cell stack body in an outer case. The first joint part includes a tightening member for tightening the first power output unit and the first external connector together by screw tightening, and a cover covering a screw tightening part of the tightening member from below.

19 Claims, 8 Drawing Sheets

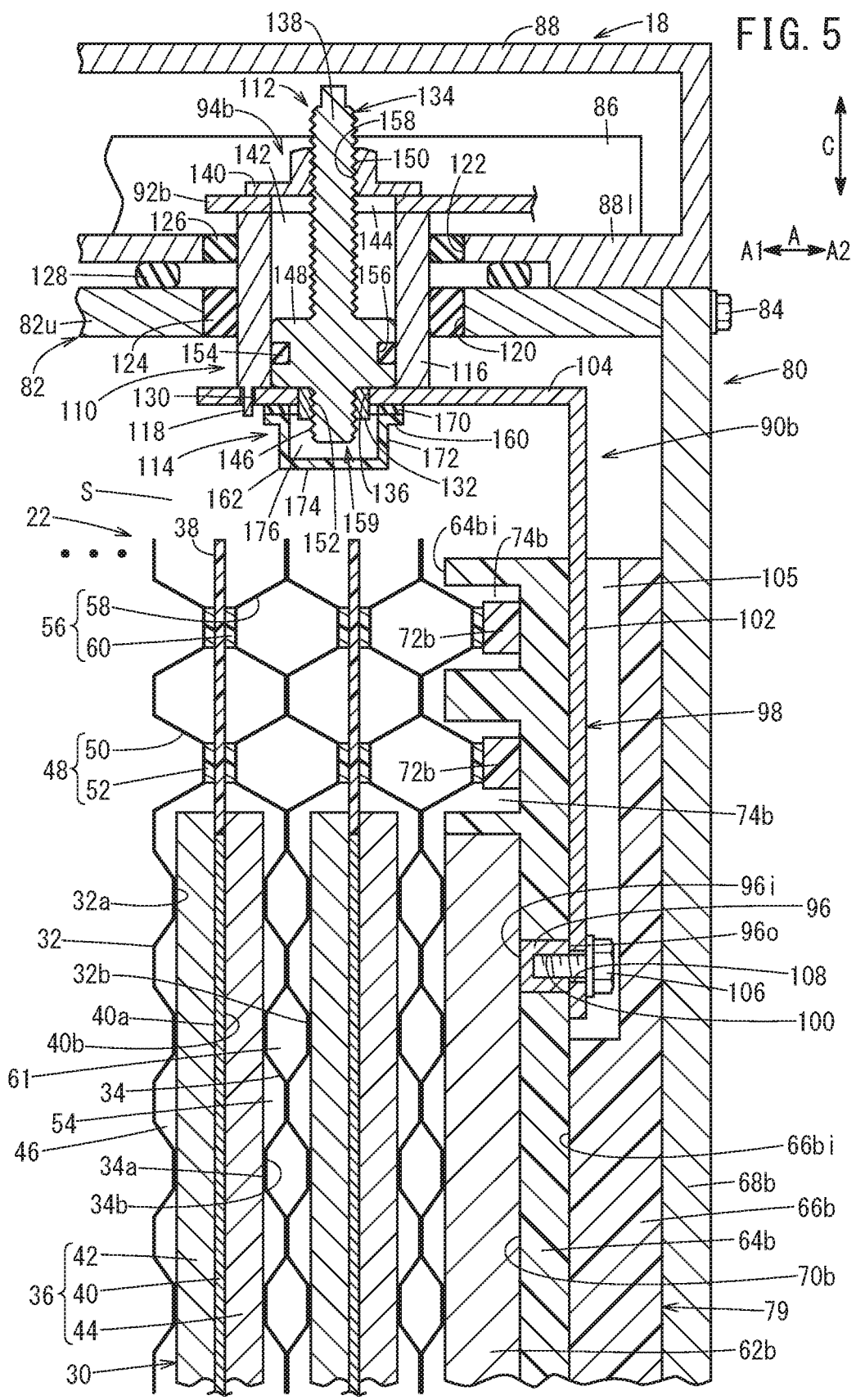

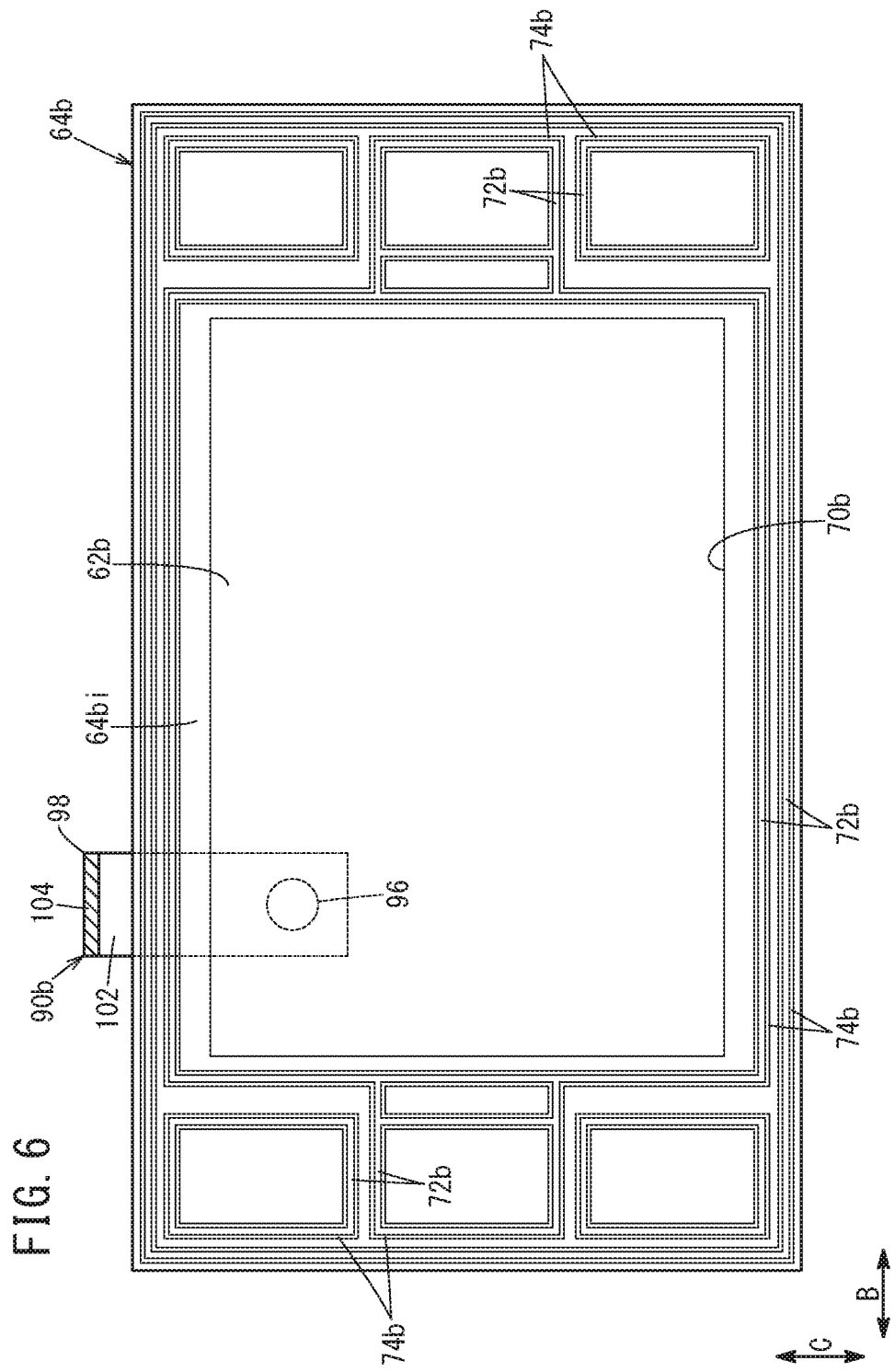

FUEL CELL SYSTEM

CROSS-REFERENCE TO RELATED APPLICATION

This application is based upon and claims the benefit of priority from Japanese Patent Application No. 2019-020373 filed on Feb. 7, 2019, the contents of which are incorporated herein by reference.

BACKGROUND OF THE INVENTION

Field of the Invention

The present invention relates to a fuel cell system.

Description of the Related Art

For example, Japanese Patent No. 4174025 discloses a fuel cell system including a cell stack body formed by stacking a plurality of power generation cells together in a stacking direction. Each of the power generation cells includes a membrane electrode assembly and a separator. Terminal plates are provided at ends of the cell stack body in the stacking direction. Power output units (terminal units) for collecting electrical energy generated in the power generation cells to the outside are electrically connected to the terminal plates.

SUMMARY OF THE INVENTION

In this regard, at a position above the cell stack body in an outer case which covers the cell stack body, as shown in FIG. 12 of Japanese Patent No. 4174025, in the case of tightening a power output unit and an external connector by screw tightening, using a tightening member, metal chips produced at the time of screw tightening may drop onto the cell stack body.

The present invention has been made taking such a problem into account, and an object of the present invention is to provide a fuel cell system which makes it possible to prevent metal chips, which are produced at the time of tightening a power output unit and an external connector together by screw tightening above a cell stack body in an outer case, from dropping onto the cell stack body.

According to one aspect of the present invention, provided is a fuel cell system including a cell stack body comprising a plurality of power generation cells stacked together in a stacking direction, the power generation cells each including a membrane electrode assembly and a separator; an outer case configured to cover the cell stack body; and a terminal plate provided at an end of the cell stack body in the stacking direction, a power output unit configured to collect electrical energy generated in the power generation cell to an outside being electrically connected to the terminal plate, wherein the power output unit is electrically connected to an external connector through a joint part at a position above the cell stack body in the outer case, and the joint part includes a tightening member configured to tighten the power output unit and the external connector together by screw tightening, and a cover configured to cover a screw tightening part of the tightening member from below.

In the present invention, since the cover which covers the screw tightening part of the tightening member from below is provided, it is possible to receive the metal chips produced at the time of screw tightening by the cover. In the structure, it is possible to prevent metal chips, which are produced at the time of tightening the power output unit and the external connector together by screw tightening above the cell stack body in the outer case, from dropping onto the cell stack body.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a cross sectional view partially in cross section, taken along a line V-V in FIG. 1;

FIG. 6 is a plan view viewed from the inside in a stacking direction, showing a second inner insulator and a second terminal plate;

DESCRIPTION OF THE PREFERRED EMBODIMENTS

Hereinafter, preferred embodiments of a fuel cell system including a fuel cell stack according to the present invention will be described with reference to the accompanying drawings.

Figure 1:
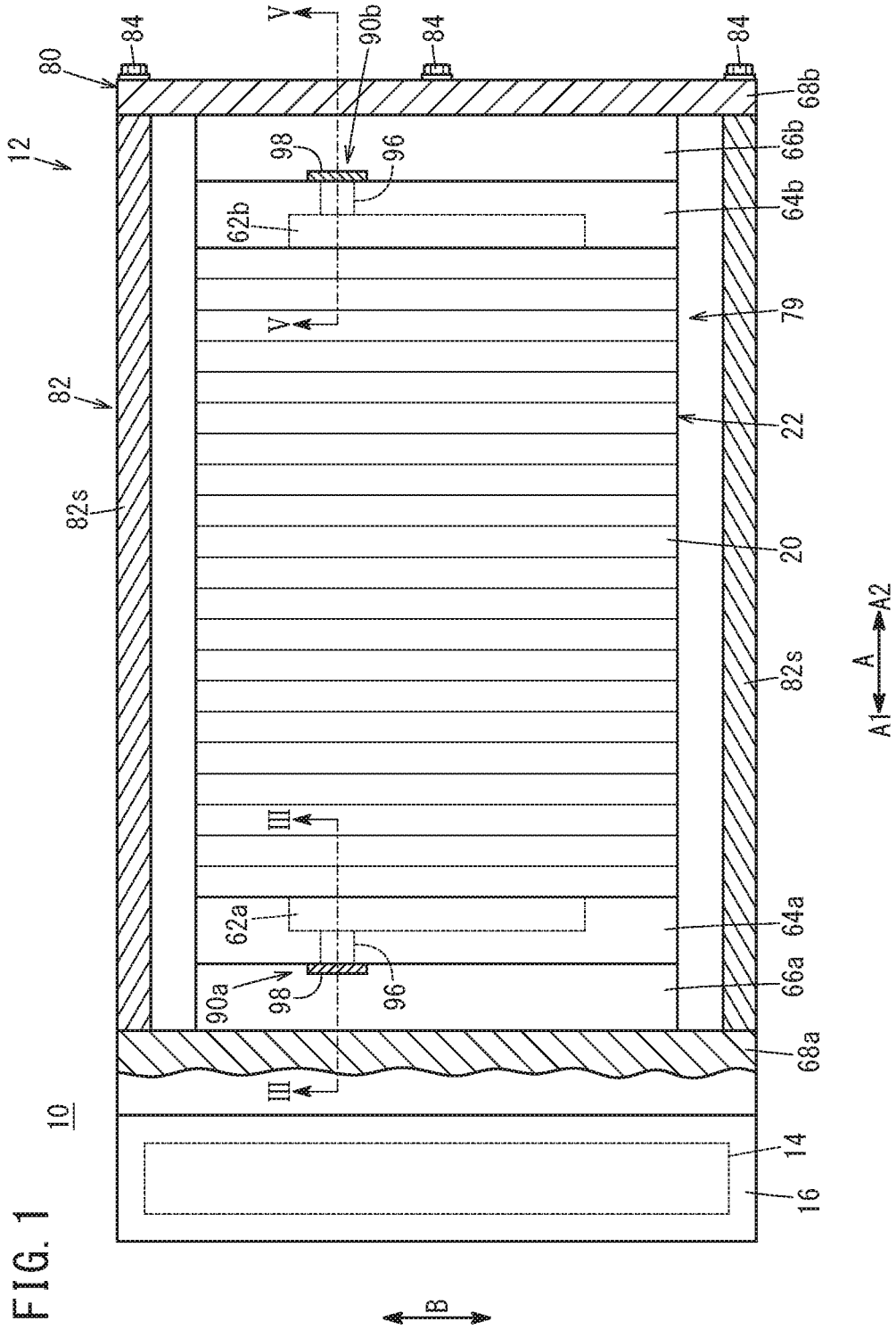
FIG. 1 is a plan view partially in cross section, showing a fuel cell system according to an embodiment of the present invention.

For example, a fuel cell system 10 shown in FIG. 1 is mounted in a fuel cell electrical automobile (not shown). It should be noted that the fuel cell system 10 may be used in stationary applications as well.

Figure 3:
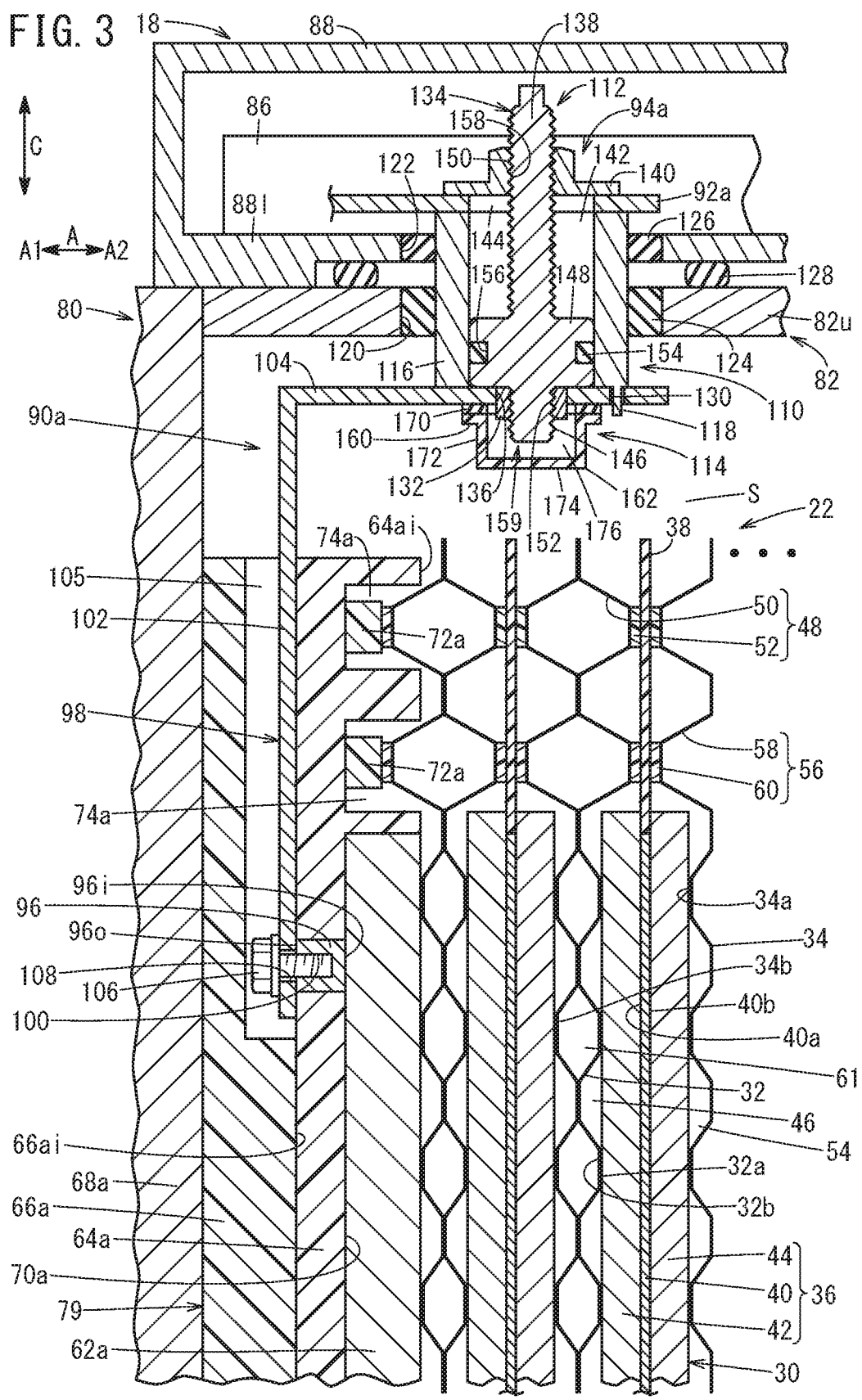
FIG. 3 is a cross sectional view partially in cross section, taken along a line III-III in FIG. 1.

As shown in FIG. 1, the fuel cell system 10 includes a fuel cell stack 12, a fuel cell auxiliary device 14, an auxiliary device case 16, and a contactor unit 18 (see FIGS. 3 and 5).

The fuel cell stack 12 includes a cell stack body 22 formed by stacking a plurality of power generation cells 20 in a horizontal direction (indicated by an arrow A). Each of the power generation cells 20 generates power by electrochemical reactions of a fuel gas and an oxygen-containing gas. For example, the power generation cell 20 is a solid polymer electrolyte fuel cell having a laterally elongated (or longitudinally elongated) rectangular shape.

Figure 2:
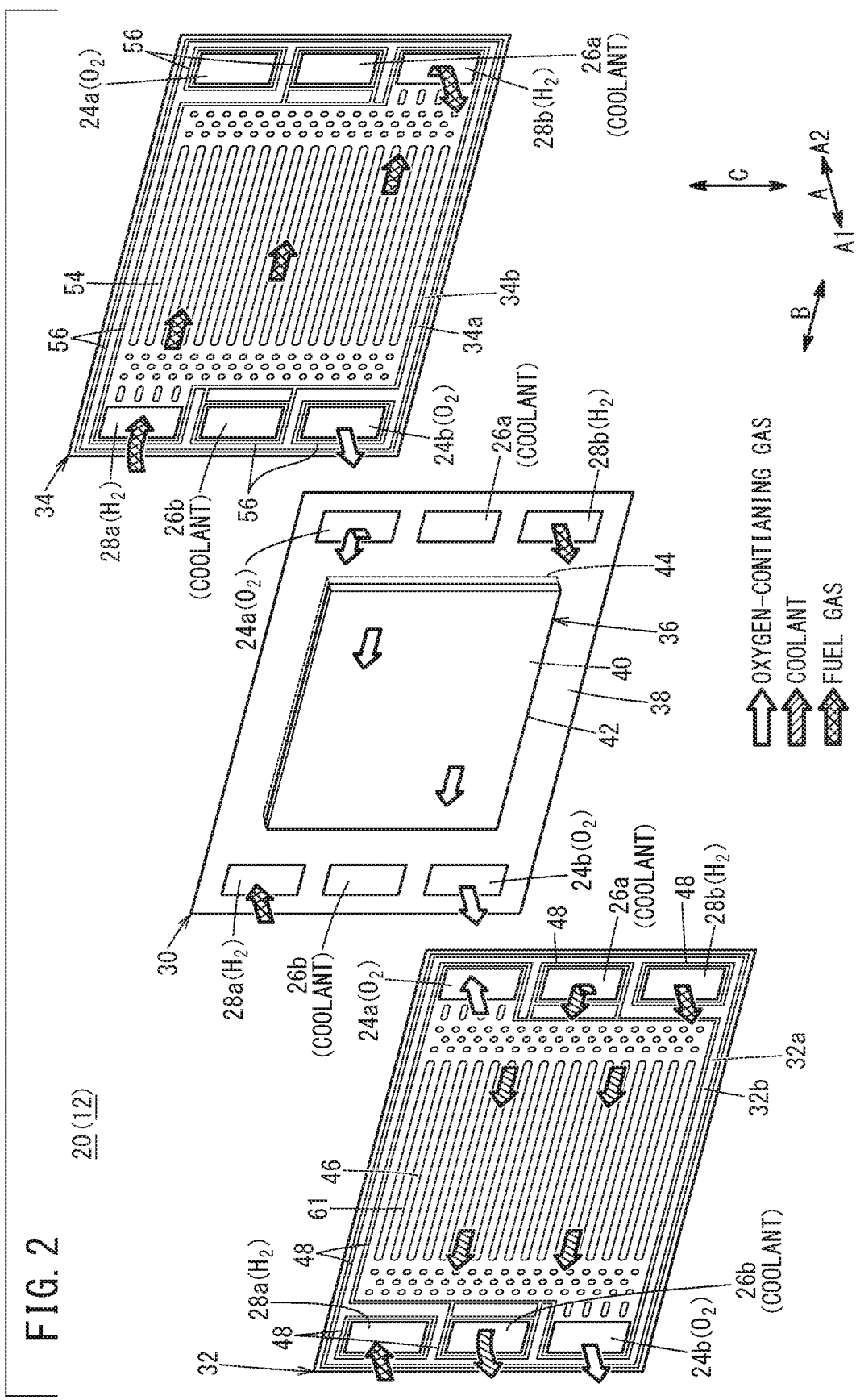
FIG. 2 is an exploded perspective view showing a power generation cell.

As shown in FIG. 2, at one end of the power generation cell 20 in a direction indicated by an arrow B (horizontal direction), an oxygen-containing gas supply passage 24a, a coolant supply passage 26a, and a fuel gas discharge passage 28b are arranged in a direction indicated by an arrow C (vertical direction). An oxygen-containing gas is supplied through the oxygen-containing gas supply passage 24a. A coolant such as pure water, ethylene glycol, or oil is supplied through the coolant supply passage 26a. A fuel gas such as the hydrogen-containing gas is discharged through the fuel gas discharge passage 28b.

The oxygen-containing gas supply passage 24a extends through the power generation cells 20 in the stacking direction indicated by the arrow A. The coolant supply passage 26a extends through the power generation cells 20 in the stacking direction. The fuel gas discharge passage 28b extends through the power generation cells 20 in the stacking direction.

At the other end of the power generation cells 20 in the direction indicated by the arrow B, a fuel gas supply passage 28a, a coolant discharge passage 26b, and an oxygen-containing gas discharge passage 24b are arranged in the direction indicated by the arrow C. The fuel gas is supplied through the fuel gas supply passage 28a. The coolant is discharged through the coolant discharge passage 26b. The oxygen-containing gas is discharged through the oxygen-containing gas discharge passage 24b.

The fuel gas supply passage 28a extends through the power generation cells 20 in the stacking direction. The coolant discharge passage 26b extends through the power generation cells 20 in the stacking direction. The oxygen-containing gas discharge passage 24b extends through the power generation cells 20 in the stacking direction.

As shown in FIGS. 2 and 3, the power generation cell 20 includes a frame equipped membrane electrode assembly (hereinafter referred to as a "frame equipped MEA 30"), and a first separator 32 and a second separator 34 disposed on both sides of the frame equipped MEA 30.

The frame equipped MEA 30 includes a membrane electrode assembly (hereinafter referred to as a "MEA 36"), and a frame member 38 provided on an outer peripheral portion of the MEA 36. The MEA 36 includes an electrolyte membrane 40, a cathode 42 provided on one surface 40a of the electrolyte membrane 40, and an anode 44 provided on another surface 40b of the electrolyte membrane 40.

For example, the electrolyte membrane 40 is a solid polymer electrolyte membrane (cation ion exchange membrane). For example, the sold polymer electrolyte membrane is a thin membrane of perfluorosulfonic acid containing water. The electrolyte membrane 40 is interposed between the cathode 42 and the anode 44. A fluorine based electrolyte may be used as the electrolyte membrane 40. Alternatively, an HC (hydrocarbon) based electrolyte may be used as the electrolyte membrane 40.

The frame member 38 has a quadrangular annular shape (quadrangular frame shape). An inner peripheral end of the frame member 38 is held between an outer peripheral end of the cathode 42 and an outer peripheral end of the anode 44. It should be noted that the frame member 38 may be provided integrally with the electrolyte membrane 40.

The cathode 42 includes a first electrode catalyst layer joined to one surface 40a of the electrolyte membrane 40, and a first gas diffusion layer stacked on the first electrode catalyst layer. The anode 44 includes a second electrode catalyst layer joined to the other surface 40b of the electrolyte membrane 40, and a second gas diffusion layer stacked on the second electrode catalyst layer.

Each of the first separator 32 and the second separator 34 has a laterally elongated (or longitudinally elongated) rectangular shape. Each of the first separator 32 and the second separator 34 is made of electrically conductive material. Specifically, each of the first separator 32 and the second separator 34 comprises, e.g., a steel plate, a stainless steel plate, an aluminum plate, a plated steel plate, or a metal plate having an anti-corrosive surface by surface treatment, or a carbon member.

The first separator 32 has an oxygen-containing gas flow field 46 on its surface facing the frame equipped MEA 30 (hereinafter referred to as a "surface 32a"). The oxygen-containing gas flow field 46 is connected to the oxygen-containing gas supply passage 24a and the oxygen-containing gas discharge passage 24b.

A first seal line 48 is provided on the surface 32a of the first separator 32, for preventing leakage of fluid (the oxygen-containing gas, the fuel gas, and the coolant) to the outside.

In FIG. 2, the first seal line 48 is provided around the oxygen-containing gas supply passage 24a, the oxygen-containing gas flow field 46, and the oxygen-containing gas discharge passage 24b, while allowing the oxygen-containing gas flow field 46 to be connected to the oxygen-containing gas supply passage 24a and the oxygen-containing gas discharge passage 24b. Further, the first seal line 48 is provided around the coolant supply passage 26a, the coolant discharge passage 26b, the fuel gas supply passage 28a, and the fuel gas discharge passage 28b, respectively.

In FIG. 3, the first seal line 48 contacts the frame member 38 of the frame equipped MEA 30 in an air tight, and liquid tight manner. The first seal line 48 includes a first bead seal 50 and a first resin member 52. The first bead seal 50 is formed by press forming. The first bead seal 50 is expanded from the surface 32a of the first separator 32 toward the frame equipped MEA 30. The first resin member 52 is fixed to a protruding end surface of the first bead seal 50 by printing or coating.

The first resin member 52 may be fixed to the frame member 38. The first resin member 52 may be dispensed with. In this case, the first bead seal 50 directly contacts the frame member 38 of the frame equipped MEA 30. The first seal line 48 may include, instead of the first bead seal 50, a ridge shaped seal part comprising an elastic member protruding toward the frame member 38 of the frame equipped MEA 30.

As shown in FIGS. 2 and 3, the second separator 34 has a fuel gas flow field 54 on its surface facing the frame equipped MEA 30 (hereinafter referred to as a "surface 34a"). The fuel gas flow field 54 is connected to the fuel gas supply passage 28a and the fuel gas discharge passage 28b.

A second seal line 56 is provided on the surface 34a of the second separator 34, for preventing leakage of fluid (the oxygen-containing gas, the fuel gas, and the coolant) to the outside.

In FIG. 2, the second seal line 56 is provided around the fuel gas supply passage 28a, the fuel gas flow field 54, and the fuel gas discharge passage 28b, while allowing the fuel gas flow field 54 to be connected to the fuel gas supply passage 28a and the fuel gas discharge passage 28b. The second seal line 56 is provided around the coolant supply passage 26a, the coolant discharge passage 26b, the oxygen-containing gas supply passage 24a, and the oxygen-containing gas discharge passage 24b, respectively.

In FIG. 3, the second seal line 56 contacts the frame member 38 of the frame equipped MEA 30 in an air tight and a liquid tight manner. The second seal line 56 includes a second bead seal 58 and a second resin member 60. The second bead seal 58 is formed by press forming. The second bead seal 58 is expanded from the surface 34a of the second separator 34 toward the frame equipped MEA 30. The second resin member 60 is fixed to a protruding end surface of the second bead seal 58 by printing or coating.

The second resin member 60 may be fixed to the frame member 38. The second resin member 60 may be dispensed with. In this case, the second bead seal 58 directly contacts the frame member 38 of the frame equipped MEA 30. The second seal line 56 may include, instead of the second bead seal 58, a ridge shaped seal part comprising an elastic member protruding toward the frame member 38 of the frame equipped MEA 30.

As shown in FIGS. 2 and 3, a coolant flow field 61 is formed between a surface 32b of the first separator 32 and a surface 34b of the second separator 34 that are adjacent to each other. The coolant flow field 61 is connected to the coolant supply passage 26a and the coolant discharge passage 26b, and extends in the direction indicated by the arrow B. The coolant flow field 61 is formed by the back surface of the fuel gas flow field 54 and the back surface of the oxygen-containing gas flow field 46.

As shown in FIGS. 1 and 3, at one end of the cell stack body 22 in the stacking direction (end in a direction indicated by an arrow A1), a first terminal plate 62a is provided. A first inner insulator 64a is provided outside the first terminal plate 62a. A first outer insulator 66a is provided outside the first inner insulator 64a. Further, a first end plate 68a is provided outside the first outer insulator 66a.

The first terminal plate 62a is made of electrically conductive material such as copper, aluminum, stainless steel, titanium, or metal chiefly containing these materials. The first terminal plate 62a has a quadrangular shape (see FIG. 4).

For example, each of the first inner insulator 64a and the first outer insulator 66a is made of polycarbonate (PC) or phenol resin. Each of the first inner insulator 64a and the first outer insulator 66a has a laterally elongated (or longitudinally elongated) rectangular shape (see FIG. 4).

The first inner insulator 64a and the first outer insulator 66a may be made of the same material, may have the same shape, and may have the same size, etc. Alternatively, the first inner insulator 64a and the first outer insulator 66a may be made of different materials, may have different shapes, and may have different sizes, etc.

Figure 4:
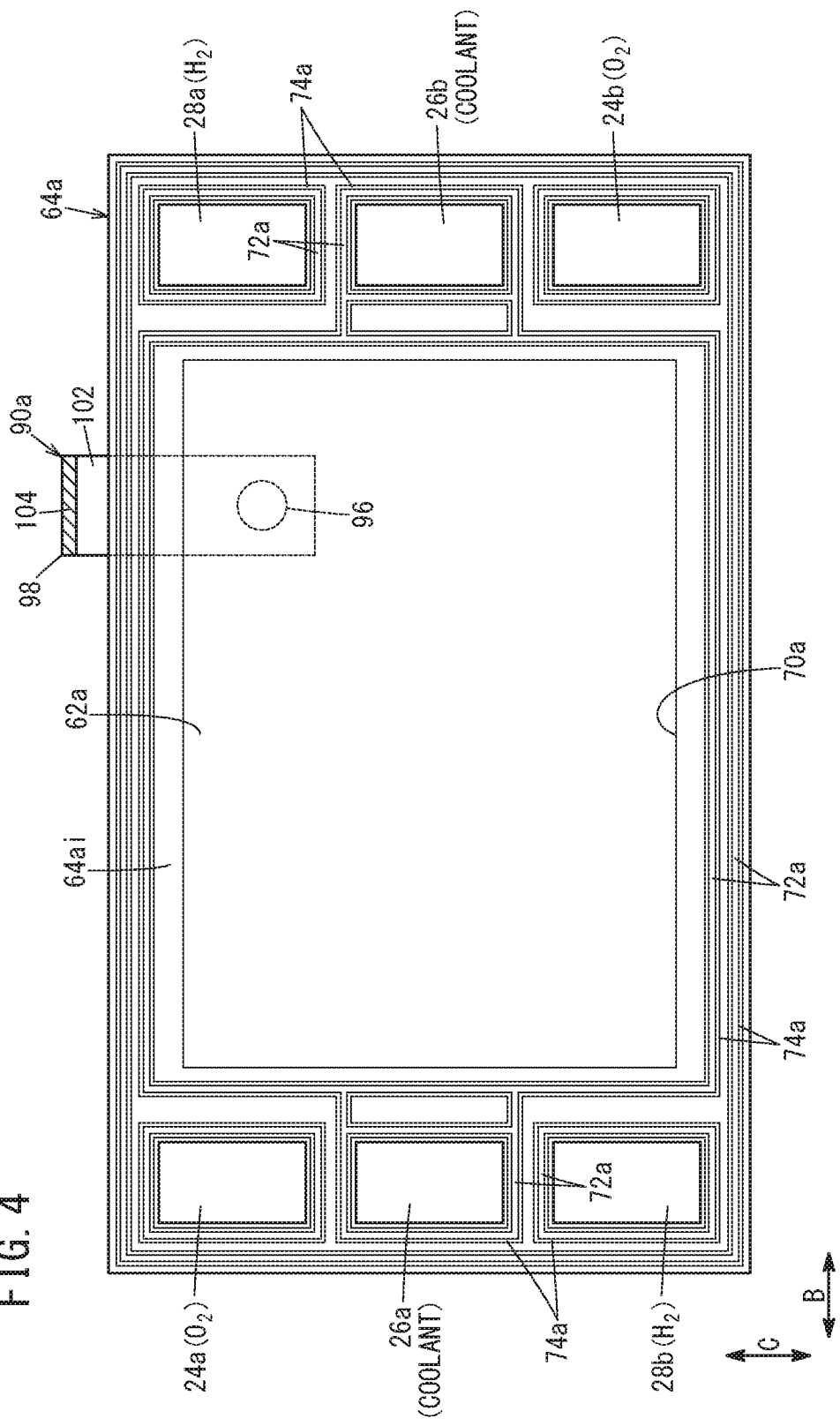
FIG. 4 is a plan view viewed from the inside in a stacking direction, showing a first inner insulator and a first terminal plate.

In FIG. 4, at one end of the first inner insulator 64a and the first outer insulator 66a in the direction indicated by the arrow B, the oxygen-containing gas supply passage 24a, the coolant supply passage 26a, and the fuel gas discharge passage 28b are arranged in the direction indicated by the arrow C. At the other end of the first inner insulator 64a and the first outer insulator 66a in the direction indicated by the arrow B, the fuel gas supply passage 28a, the coolant discharge passage 26b, and the oxygen-containing gas discharge passage 24b are arranged in the direction indicated by the arrow C.

As shown in FIGS. 3 and 4, the first inner insulator 64a has, on its surface 64ai oriented inward in the stacking direction, a quadrangular first inner recess 70a in which the first terminal plate 62a is disposed.

The first inner insulator 64a has a first seal part 72a on the surface 64ai facing the cell stack body 22. The first seal part 72a is provided around the first terminal plate 62a in order to prevent leakage of fluid (the fuel gas, the oxygen-containing gas, and the coolant). The first seal part 72a contacts the second seal line 56 of the second separator 34 positioned at one end of the cell stack body 22 in the stacking direction (end in the direction indicated by the arrow A1).

In FIG. 4, the first seal part 72a is provided around the first terminal plate 62a. Further, the first seal part 72a is provided around the oxygen-containing gas supply passage 24a, the oxygen-containing gas discharge passage 24b, the coolant supply passage 26a, the coolant discharge passage 26b, the fuel gas supply passage 28a, and the fuel gas discharge passage 28b, respectively.

As shown in FIGS. 3 and 4, the first seal part 72a is disposed in a first seal recess 74a formed in the surface 64ai of the first inner insulator 64a. For example, the first seal part 72a has a rectangular shape in lateral cross section, and made of elastic polymer material. Examples of such polymer material include silicone rubber, acrylic rubber, nitrile rubber, etc. The first seal part 72a is joined to the bottom surface of the first seal recess 74a. The position, the size, the shape, etc. of the first seal part 72a may be determined as necessary.

As shown in FIGS. 1 and 5, at the other end of the cell stack body 22 (end in a direction indicated by an arrow A2), a second terminal plate 62b is provided. A second inner insulator 64b is provided outside the second terminal plate 62b. A second outer insulator 66b is provided outside the second inner insulator 64b. Further, a second end plate 68b is provided outside the second outer insulator 66b.

The second terminal plate 62b is made of electrically conductive material such as copper, aluminum, stainless steel, titanium, or metal chiefly containing these materials. The second terminal plate 62b has a quadrangular shape (see FIG. 6).

For example, each of the second inner insulator 64b and the second outer insulator 66b is made of polycarbonate (PC) or phenol resin. Each of the second inner insulator 64b and the second outer insulator 66b has a laterally elongated (or longitudinally elongated) rectangular shape (see FIG. 6).

The second inner insulator 64b and the second outer insulator 66b may be made of the same material, may have the same shape, and may have the same size, etc. Alternatively, the second inner insulator 64b and the second outer insulator 66b may be made of different materials, may have different shapes, and may have different sizes, etc.

As shown in FIGS. 5 and 6, the second inner insulator 64b has, on its surface 64bi oriented inward in the stacking direction, a quadrangular second recess 70b in which the second terminal plate 62b is disposed.

The second inner insulator 64b has a second seal part 72b on the surface 64bi facing the cell stack body 22. The second seal part 72b is provided around the second terminal plate 62b in order to prevent leakage of fluid (the fuel gas, the oxygen-containing gas, and the coolant). The second seal part 72b contacts the first seal line 48 of the first separator 32 positioned at the other end of the cell stack body 22 in the stacking direction (end in the direction indicated by the arrow A2). The second seal part 72b is provided around the second terminal plate 62b.

The second seal part 72b is disposed in a second seal recess 74b formed in the surface 64bi of the second inner insulator 64b. For example, the second seal part 72b has a rectangular shape in lateral cross section, and made of elastic polymer material. Examples of such polymer material include silicone rubber, acrylic rubber, nitrile rubber, etc. The second seal part 72b is joined to the bottom surface of the second seal recess 74b. The position, the size, the shape, etc. of the second seal part 72b may be determined as necessary.

As shown in FIGS. 1, 3, and 5, the fuel cell stack 12 includes a stack case 80 containing a stack body 79 (the cell stack body 22, the first terminal plate 62a, the first inner insulator 64a, the first outer insulator 66a, the second terminal plate 62b, the second inner insulator 64b, and the second outer insulator 66b).

The stack case 80 includes an outer case 82, the first end plate 68*a*, and the second end plate 68*b*. The outer case 82 covers side surfaces of the stack body 79 from directions perpendicular to the stacking direction of the cell stack body 22. The outer case 82 has a quadrangular cylindrical shape. The outer case 82 includes a lower wall (not shown), an upper wall 82*u*, and left and right side walls 82*s*. A gap S is formed between the upper wall 82*u* and the cell stack body 22 (see FIGS. 3 and 5).

The first end plate 68*a* is coupled to one end of the outer case 82 using a plurality of tightening members (not shown) such as screw members. The second end plate 68*b* is coupled to the other end of the outer case 82 using a plurality of tightening members 84 such as screw members. The first end plate 68*a* and the second end plate 68*b* apply, to the cell stack body 22, the tightening load toward the inside in the stacking direction.

In FIG. 1, the fuel cell auxiliary device 14 includes fuel gas system auxiliary devices (fuel gas supply devices) such as an injector, an ejector, a hydrogen pump, and valves. The auxiliary device case 16 is a case for protecting the fuel cell auxiliary device 14, and is coupled to the first end plate 68*a*.

In FIGS. 3 and 5, the contactor unit 18 is disposed on an outer surface (e.g., upper surface) of the upper wall 82*u*. The contactor unit 18 is a switch box, and includes a contactor 86 (switch), and a contactor case 88 that is disposed on an outer surface of the outer case 82 while containing the contactor 86.

As shown in FIG. 3, a first external connector 92*a* is electrically connected to an input terminal (not shown) of the contactor 86. The first external connector 92*a* is a band shaped plate (bus bar) electrically connected to a terminal of the contactor 86. The first external connector 92*a* is made of electrically conductive material such as copper, aluminum, stainless steel, titanium, or metal chiefly containing these materials. The first external connector 92*a* is electrically connected, through a first joint part 94*a*, to a first power conductor unit 90*a* electrically connected to the first terminal plate 62*a*.

The first power output unit 90*a* is a power line for collecting electrical energy generated in the power generation cells 20 to the outside. The first power output unit 90*a* includes a first conductor 96 and a second conductor 98. The first conductor 96 is a circular column member extending in the stacking direction in a manner to penetrate through the first inner insulator 64*a* in the stacking direction.

The first conductor 96 is not limited to the circular column member, and may be a quadrangular column member, a cylindrical member, etc. The first conductor 96 is made of electrically conductive material such as copper, aluminum, stainless steel, titanium, or metal chiefly containing these materials. The first conductor 96 may be made of electrically conductive material other than metal.

In FIG. 3, an end surface 96*i* of the first conductor 96 on the cell stack body 22 side is joined to a surface of the first terminal plate 62*a* on the opposite side to the cell stack body 22. Preferably, the first conductor 96 and the first terminal plate 62*a* are joined together by means of welding, but may be joined together using bolts, rivets, crimping, adhesive, etc.

In FIG. 4, the first conductor 96 is provided at a position shifted upward and sideward from the center of the first terminal plate 62*a*. A screw hole 100 is formed in an end surface 96*o* of the first conductor 96 on the opposite side to the cell stack body 22 (see FIG. 3).

The position where the first conductor 96 is joined to the first terminal plate 62*a* can be determined as necessary. The first conductor 96 and the first terminal plate 62*a* may be a one-piece molded component.

As shown in FIG. 3, the second conductor 98 is a band shaped plate (bus bar). The second conductor 98 is made of electrically conductive material such as copper, aluminum, stainless steel, titanium, or metal chiefly containing these materials. In the state where the second conductor 98 is disposed on the first inner insulator 64*a* on the opposite side to the cell stack body 22 (indicated by the arrow A1), the second conductor 98 extends from the first conductor 96 to the outside of an upper outer peripheral end of the first inner insulator 64*a*. The second conductor 98 is electrically connected, by the first joint part 94*a*, to the first external connector 92*a* inside the first end plate 68*a* in the stacking direction of the cell stack body 22.

The second conductor 98 is an-L shaped one-piece molded component, and includes a first extension part 102 and a second extension part 104 (extension part). The first extension part 102 extends in the direction indicated by the arrow C (vertical direction) along the first inner insulator 64*a*. Specifically, the first extension part 102 is disposed between the first inner insulator 64*a* and the first outer insulator 66*a*. The first extension part 102 is disposed in a recess 105 formed in a surface 66*ai* of the first outer insulator 66*a*.

A hole 108, into which a tightening member 106 as a screw member is inserted, is formed at one end (lower end) of the first extension part 102. The tightening member 106 is screwed with the screw hole 100 to join the first conductor 96 and the second conductor 98 together.

The tightening member 106 is not limited to the screw member, and may be a crimping member, a rivet, etc. The first conductor 96 and the second conductor 98 may be a one-piece molded component. The second conductor 98 may be welded to, or adhered to the first conductor 96.

The other end (upper end, extended end) of the first extension part 102 is positioned in a gap S between the upper wall 82*u* and the first outer insulator 66*a*. The second extension part 104 extends from the extended end of the first extension part 102 toward the cell stack body 22 (in the direction indicated by the arrow A2). The second extension part 104 and the cell stack body 22 are spaced from each other.

The extended end of the second extension part 104 is positioned between the cell stack body 22 and the upper wall 82*u*. The extended end of the second extension part 104 is connected to the first external connector 92*a* through the first joint part 94*a*. The second conductor 98 may be formed by joining the first extension part 102 and the second extension part 104 together.

As shown in FIG. 3, the first joint part 94*a* includes an electrically conductive member 110, a tightening member 112, and a cover 114. For example, the electrically conductive member 110 is made of copper, aluminum, stainless steel, titanium, or metal chiefly containing these materials. The electrically conductive member 110 includes an electrical conductor body 116 having a cylindrical shape, and a rotation stopper 118 provided to the electrical conductor body 116.

The electrical conductor body 116 extends vertically in a manner that the electrical conductor body 116 is inserted into a first opening 120 formed in the upper wall 82*u* of the outer case 82 and a second opening 122 formed in a lower wall 88*l* of the contactor case 88. That is, one end of the electrical conductor body 116 is positioned inside the stack case 80, and the other end of the electrical conductor body 116 is positioned inside the contactor case 88.

A first annular seal member 124 is provided in the first opening 120. The first annular seal member 124 seals a portion between an outer circumferential surface of the electrical conductor body 116 and a wall surface forming the first opening 120 in an air tight manner. A second annular seal member 126 is provided in the second opening 122. The second annular seal member 126 seals a portion between the outer circumferential surface of the electrical conductor body 116 and a wall surface forming the second opening 122 in an air tight manner.

A third annular seal member 128 is provided outside the electrical conductor body 116 in the radial direction. The third annular seal member 128 seals a portion between an upper surface of the outer case 82 and a lower surface of the contactor case 88 in an air tight manner. The first annular seal member 124, the second annular seal member 126, and the third annular seal member 128 prevent the fuel gas (hydrogen gas) leaked from the cell stack body 22 from flowing to the outside. Each of the first annular seal member 124, the second annular seal member 126, and the third annular seal member 128 is an elastic member such as a rubber member.

One end surface (lower end surface) of the electrical conductor body 116 contacts an upper surface of the second extension part 104 of the first power output unit 90a. The other end surface (upper end surface) of the electrical conductor body 116 contacts a lower surface of the first external connector 92a. In the structure, the first power output unit 90a and the first external connector 92a are electrically connected together through the electrically conductive member 110. The electrical conductive body 116 is not limited to have a circular cylindrical shape, and may have a quadrangular cylindrical shape.

The rotation stopper 118 prevents rotation of the electrical conductor body 116 relative to the second extension part 104 in the circumferential direction. The rotation stopper 118 protrudes downward from one end surface of the electrical conductor body 116, and is inserted into a hole 130 formed at the extended end of the second extension part 104. It should be noted that, instead of the hole 130, a recess (not shown), into which the rotation stopper 118 is inserted, may be formed in the upper surface of the second extension part 104.

The tightening member 112 tightens the first power output unit 90a and the first external connector 92a together by screw tightening. Specifically, the tightening member 112 includes a nut 132 fixed to the second extension part 104, and a bolt 134 screwed with the nut 132 to tighten the first external connector 92a downward.

The nut 132 is inserted under pressure into a through hole 136 formed in the extended end of the second extension part 104. It should be noted that the nut 132 may be joined to a wall surface forming the through hole 136 by welding, etc.

The bolt 134 includes a bolt body 138, and a presser 140 provided to the bolt body 138. The bolt body 138 extends vertically in a manner that the bolt body 138 is inserted into the through hole 136 of the second extension part 104, an inner hole 142 of the electrical conductor body 116, and a through hole 144 formed in the first external connector 92a. The bolt body 138 is longer than the entire length of the electrical conductor body 116. The bolt body 138 includes a first male screw portion 146, a large diameter portion 148, and a second male screw portion 150. Further, a tool hanger (wrench hanger) for hanging a tool (wrench) for tightening the bolt 134 is provided to the bolt body 138.

The first male screw portion 146 is formed at one end of the bolt body 138, and is screwed with a female screw portion 152 of the nut 132. The large diameter portion 148 is shifted toward one end from the center of the bolt body 138 in the longitudinal direction, and positioned above and adjacent to the first male screw portion 146. The outer circumferential surface of the large diameter portion 148 contacts (or is positioned closer to) the inner circumferential surface of the electrical conductor body 116. An annular groove 156, in which an annular seal member 154 is disposed, is formed in the outer circumferential surface of the large diameter portion 148. The annular seal member 154 seals the portion between the large diameter portion 148 and the electrical conductor body 116 in an air tight manner.

The seal member 154 makes it possible to reliably prevent entry of the fuel gas, which is leaked out of the cell stack body 22, into the contactor case 88 through a gap between the electrical conductor body 116 and the bolt body 138. The second male screw portion 150 is provided over an area from the large diameter portion 148 to the other end of the bolt body 138. A female screw portion 158 formed in the presser 140 is screwed with the second male screw portion 150.

The presser 140 is a flange nut having the female screw portion 158 screwed with the second male screw portion 150. The largest outer diameter of the presser 140 is larger than the diameter (hole diameter) of the through hole 144 of the first external connector 92a. That is, the presser 140 contacts an upper surface of the first external connector 92a.

The cover 114 covers a screw tightening part 159 (the first male screw portion 146 and the female screw portion 152) of the tightening member 112 from below. In the state where the cover 114 is positioned below the second extension part 104, the cover 114 is provided to the second extension part 104. The cover 114 is a one-piece molded component made of resin material.

Figure 7A:
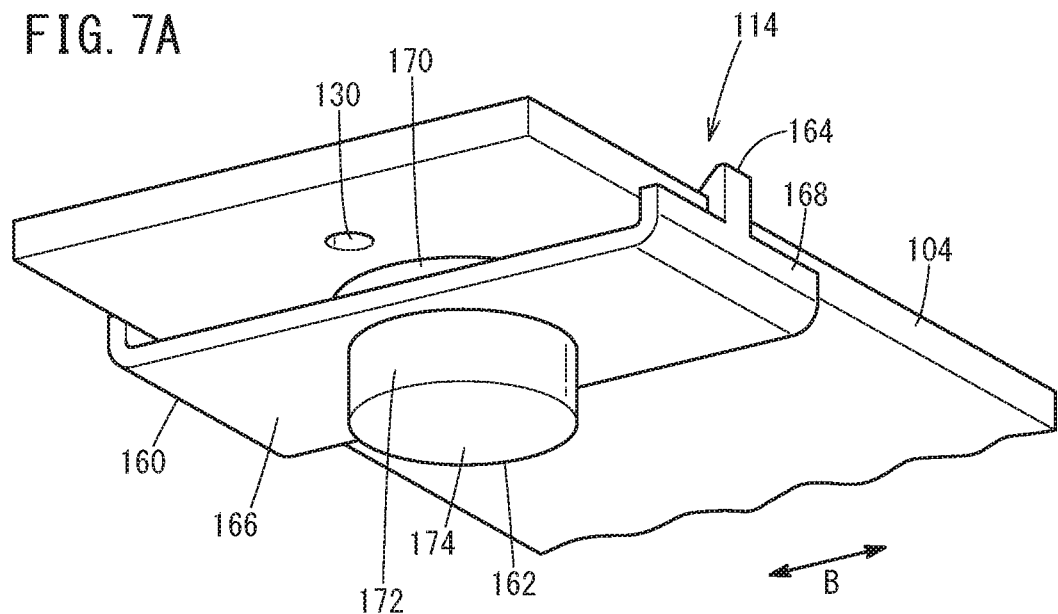
FIG. 7A is a first view showing engagement of a cover with a second conductor.
Figure 7B:
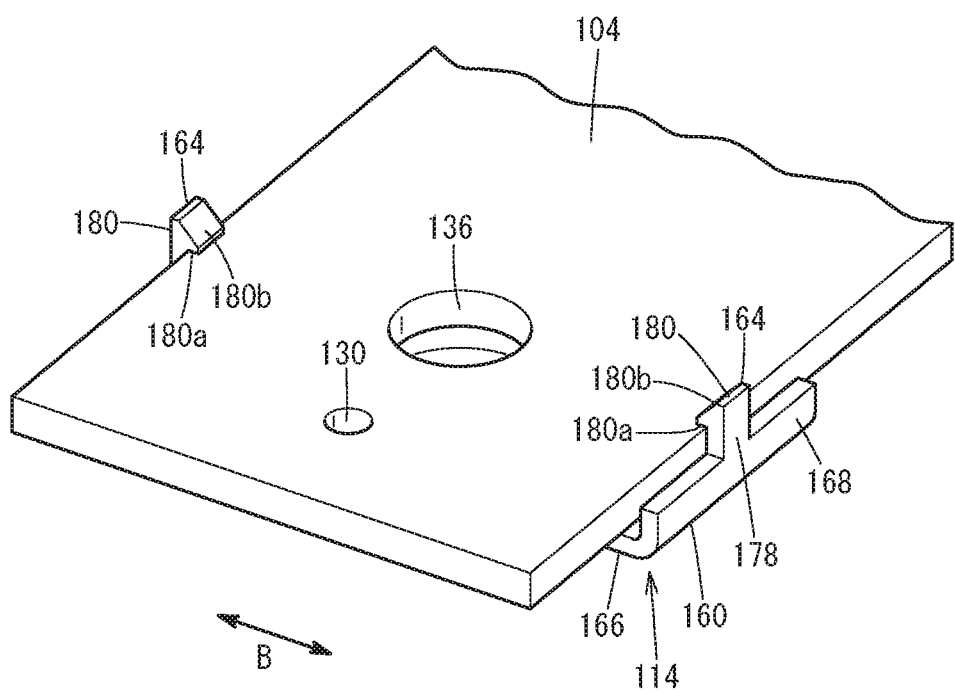
FIG. 7B is a second view showing engagement of the cover with the second conductor.

As shown in FIGS. 3, 7A, and 7B, the cover 114 includes a base 160 extending in the width direction (indicated by the arrow B) of the second extension part 104, a receiver 162 provided at the center of the base 160, and two engagement parts 164 provided at both ends of the base 160. In FIGS. 7A and 7B, for ease of understanding, only the second extension part 104 and the cover 114 are shown.

The base 160 includes a rectangular base body 166, and two projections 168 protruding upward from both ends of the base body 166 in the longitudinal direction. The base body 166 has a flat plate shape, and is positioned below the second extension part 104.

In FIG. 3, a seal member 170 is provided between an upper surface of the base body 166 and a lower surface of the second extension part 104. The seal member 170 is a porous elastic seal member. That is, the seal member 170 is a foamed seal member like a sponge. The seal member 170 is provided around the screw tightening part 159 (nut 132).

As shown in FIGS. 7A and 7B, the projection 168 extends over the entire width of the base body 166. A protruding end of the projection 168 is positioned above the lower surface of the second extension part 104. A protruding end portion of the projection 168 contacts the side surface of the second extension part 104.

In FIGS. 3 and 7A, the receiver 162 includes a circumferential wall 172 protruding downward from the base body 166, and a bottom wall 174 provided at a lower end of the circumferential wall 172. The inner diameter of the circumferential wall 172 is larger than the outer diameter of the nut 132. The bottom wall 174 has a circular shape. The center of the bottom wall 174 is coaxial with the axis of the bolt 134. A space 176 accommodating part of the bolt 134 and the nut 132 is formed in the receiver 162.

In FIGS. 7A and 7B, the two engagement parts 164 engage both sides of the second extension part 104 in the width direction. Each of the engagement parts 164 has a claw shape which is deformable elastically. That is, each of the engagement parts 164 includes a leg 178 protruding upward from a protruding end surface of the projection 168 (direction opposite to the base body 166), and a claw 180 provided at a protruding end portion of the leg 178. The leg 178 is deformable elastically in the longitudinal direction (indicated by the arrow B) of the base body 166. The claw 180 includes a flat surface 180a in parallel to the base body 166, and an inclined surface 180b inclined toward the opposite side to the receiver 162 in the direction away from the base body 166.

As shown in FIG. 5, a second external connector 92b is electrically connected to an input terminal (not shown) of the contactor 86. The second external connector 92b is a band shaped plate (bus bar) electrically connected to a terminal (not shown) of the contactor 86. The second external connector 92b is made of electrically conductive material such as copper, aluminum, stainless steel, titanium, or metal chiefly containing these materials. The second external connector 92b is electrically connected, through a second joint part 94b, to a second power output unit 90b electrically connected to the second terminal plate 62b.

The second power output unit 90b and the second joint part 94b have the same structure as the first power output unit 90a and the first joint part 94a. Therefore, description of the structure of the second power output unit 90b and the second joint part 94b is omitted.

Next, a method of joining the first power output unit 90a and the first external connector 92a together by the first joint part 94a will be described. The method of joining the second power output unit 90b and the second external connector 92b together by the second joint part 94b is the same as the joining method by the first joint part 94a, and thus, the description thereof is omitted.

As shown in FIGS. 3, 7A, and 7B, in the case of joining the first power output unit 90a and the first external connector 92a together by the first joint part 94a, the cover 114 is attached to the second extension part 104 of the first power output unit 90a beforehand. Specifically, in the state where the bottom wall 174 of the receiver 162 is positioned to face the nut 132 and the inclined surface 180b of each claw 180 is brought into contact with a corner of the second extension part 104 in the width direction, the base 160 is pressed toward the second extension part 104.

As a result, the two legs 178 are deformed elastically in a direction away from each other, and the inclined surfaces 180b slide on the corners of the second extension part 104, and the two claws 180 ride over the second extension part 104. In this manner, the cover 114 is attached to the second extension part 104. In the state where the cover 114 is attached to the second extension part 104, the flat surfaces 180a of the claws 180 are in contact with the flat surface (upper surface) of the second extension part 104.

Thereafter, by sliding the cover 114 on the second extension part 104 in the longitudinal direction of the second extension part 104, the positions of the nut 132 and the receiver 162 are adjusted finely. Then, the rotation stopper 118 of the electrically conductive member 110 is inserted into the hole 130 of the second extension part 104, and the electrical conductor body 116 is held between the second extension part 104 and the first external connector 92a.

Then, the female screw portion 158 of the presser 140 is screwed with the second male screw portion 150 of the bolt 134. Then, in this state, the bolt 134 is inserted into the inner hole 142 of the electrical conductor body 116 from above, and the large diameter portion 148 of the bolt 134 is disposed in the inner hole 142 of the electrical conductor body 116. The first male screw portion 146 of the bolt 134 is screwed with the female screw portion 152 of the nut 132.

In the structure, since the presser 140 presses the first external connector 92a downward, it is possible to reliably connect the first external connector 92a and the second extension part 104 through the electrically conductive member 110. In this regard, metal chips produced by screw tightening of the first male screw portion 146 and the female screw portion 152 of the nut 132 drop onto the bottom wall 174 of the receiver 162. Therefore, the metal chips never contact the cell stack body 22.

Next, operation of the fuel cell system 10 having the above structure will be described.

As shown in FIG. 2, an oxygen-containing gas such as the air is supplied to the oxygen-containing gas supply passage 24a. A fuel gas such as a hydrogen-containing gas is supplied to the fuel gas supply passage 28a. Coolant such as pure water, ethylene glycol, or oil is supplied to the coolant supply passage 26a.

The oxygen-containing gas flows from the oxygen-containing gas supply passage 24a into the oxygen-containing gas flow field 46 of the first separator 32. Then, the oxygen-containing gas moves along the oxygen-containing gas flow field 46 in the direction indicated by the arrow B, and the oxygen-containing gas is supplied to the cathode 42 of the MEA 36.

In the meanwhile, the fuel gas flows from the fuel gas supply passage 28a into the fuel gas flow field 54 of the second separator 34. Then, the fuel gas moves along the fuel gas flow field 54 in the direction indicated by the arrow B, and the fuel gas is supplied to the anode 44 of the MEA 36.

Thus, in each of the MEAs 36, the oxygen-containing gas supplied to the cathode 42 and the fuel gas supplied to the anode 44 are consumed in the electrochemical reactions in the first electrode catalyst layer and the second electrode catalyst layer to perform power generation.

Then, the oxygen-containing gas supplied to the cathode 42 is partially consumed at the cathode 42, and the oxygen-containing gas flows from the oxygen-containing gas flow field 46 to the oxygen-containing gas discharge passage 24b. Then, the oxygen-containing gas is discharged along the oxygen-containing gas discharge passage 24b in the direction indicated by the arrow A. Likewise, the fuel gas supplied to the anode 44 is partially consumed at the anode 44, and the fuel gas flows from the fuel gas flow field 54 to the fuel gas discharge passage 28b. Then, the fuel gas is discharged along the fuel gas discharge passage 28b in the direction indicated by the arrow A.

Further, after the coolant supplied to the coolant supply passage 26a flows into the coolant flow field 61 formed between the first separator 32 and the second separator 34 that are joined together, the coolant flows in the direction indicated by the arrow B. After the coolant cools the MEA 36, the coolant is discharged from the coolant discharge passage 26b.

In this case, the fuel cell system 10 according to the embodiment of the present invention offers the following advantages.

The power output unit (the first power output unit 90a and the second power output unit 90b) is electrically connected to the external connector (the first external connector 92a and the second external connector 92b) through the joint part (the first joint part 94a and the second joint part 94b) at a position above the cell stack body 22 in the outer case 82.

The joint part (the first joint part 94*a* and the second joint part 94*b*) includes the tightening member 112 configured to tighten the power output unit (the first power output unit 90*a* and the second power output unit 90*b*) and the external connector (the first external connector 92*a* and the second external connector 92*b*) together by screw tightening, and the cover 114 configured to cover the screw tightening part 159 of the tightening member 112 from below.

In the structure, since the cover 114 which covers the screw tightening part 159 of the tightening member 112 from below is provided, the metal chips produced at the time of screw tightening can be received by the cover 114. Accordingly, at the time of tightening the power output unit (the first power output unit 90*a* and the second power output unit 90*b*) and the external connector (the first external connector 92*a* and the second external connector 92*b*) together by screw tightening at the position above the cell stack body 22 in the outer case 82, it is possible to prevent metal chips from dropping onto the cell stack body 22.

The external connector (the first external connector 92*a* and the second external connector 92*b*) is positioned outside the outer case 82, and the joint part (the first joint part 94*a* and the second joint part 94*b*) includes the electrically conductive member 110 inserted into the opening (the first opening 120) formed in the upper wall 82*u* of the outer case 82, the upper wall being positioned above the cell stack body 22. The tightening member 112 applies a tightening force between the power output unit (the first power output unit 90*a* and the second power output unit 90*b*) and the external connector (the first external connector 92*a* and the second external connector 92*b*) in a manner that the electrically conductive member 110 is held between the power output unit (the first power output unit 90*a* and the second power output unit 90*b*) and the external connector (the first external connector 92*a* and the second external connector 92*b*).

In the structure, it is possible to reliably connect the power output unit (the first power output unit 90*a* and the second power output unit 90*b*) and the external connector (the first external connector 92*a* and the second external connector 92*b*) together through the electrically conductive member 110.

The cover 114 is provided to the power output unit (the first power output unit 90*a* and the second power output unit 90*b*) in a state where the cover 114 is positioned below the power output unit (the first power output unit 90*a* and the second power output unit 90*b*).

In the structure, it is possible to achieve the compact structure of the joint part (the first joint part 94*a* and the second joint part 94*b*).

The power output unit (the first power output unit 90*a* and the second power output unit 90*b*) includes an extension part (second extension part 104) extending in the stacking direction from an end side of the cell stack body 22 toward the inside in the stacking direction of the cell stack body 22, and the cover 114 has the engagement part 164 configured to engage both sides of the extension part (second extension part 104) in the width direction.

In the structure, it is possible to simplify the structure of the cover 114.

The engagement part 164 has a claw shape which is deformed elastically.

In the structure, it is possible to easily attach the cover 114 to the extension part (second extension part 104).

The seal member 170 is provided between the cover 114 and the extension part (second extension part 104).

In the structure, metal chips received by the cover 114 can be prevented from dropping from the gap between the cover 114 and the extension part (second extension part 104).

The seal member 170 comprises a porous elastic seal member.

In the structure, it is possible to easily and reliably provide the seal member 170 between the cover 114 and the extension part (second extension part 104).

The tightening member 112 includes the nut 132 fixed to the power output unit (the first power output unit 90*a* and the second power output unit 90*b*), and the bolt 134 screwed with the nut 132 to tighten the external connector (the first external connector 92*a* and the second external connector 92*b*) downward.

In the structure, it is possible to achieve the simple structure of the joint part (the first joint part 94*a* and the second joint part 94*b*).

Figure 8:
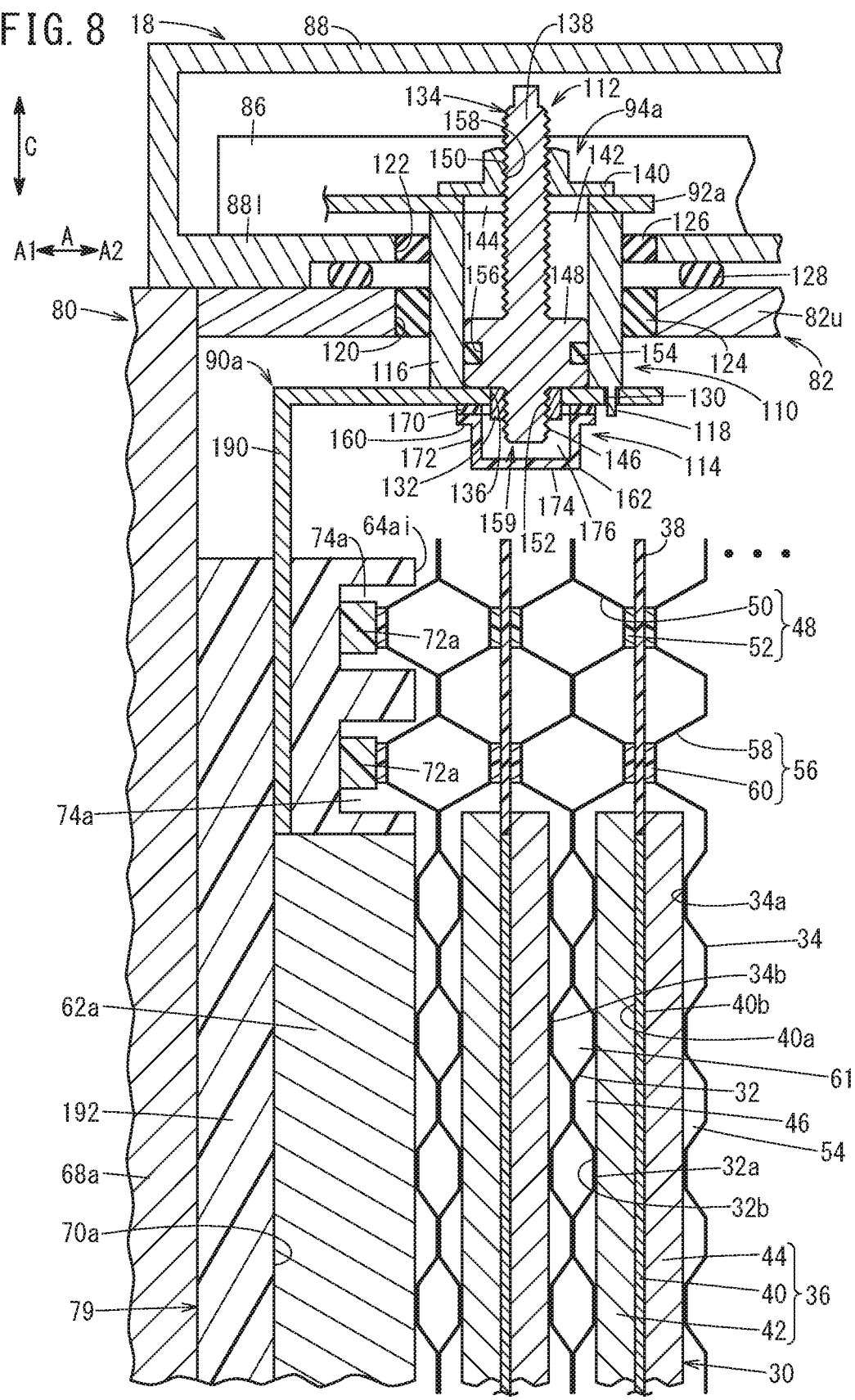
FIG. 8 is a cross sectional view showing a first power output unit according to a modified embodiment.

The present invention is not limited to the above structure. As shown in FIG. 8, the first power output unit 90*a* may be formed in a manner that a conductor 190 formed in the same manner as the second conductor 98 is directly connected to an upper surface of the first terminal plate 62*a*. The conductor 190 passes the back side of the first seal part 72*a* (outside in the stacking direction), and extends to the outside of an insulator 192. Therefore, it is possible to achieve the desired sealing performance of the first seal part 72*a*.

The position where the conductor 190 is connected to the first terminal plate 62*a* can be determined arbitrarily. The conductor 190 and the first terminal plate 62*a* may be a one-piece molded component. The second power output unit 90*b* may have the conductor 190 as in the case of the first power output unit 90*a* shown in FIG. 8.

The fuel cell stack according to the present invention is not limited to the above-described embodiments. It is a matter of course that various structures can be adopted without departing from the gist of the present invention.

What is claimed is:

1. A fuel cell system comprising:
   a cell stack body comprising a plurality of power generation cells stacked together in a stacking direction, the power generation cells each including a membrane electrode assembly and a separator;
   an outer case configured to cover the cell stack body; and
   a terminal plate provided at an end of the cell stack body in the stacking direction,
   a power output unit configured to collect electrical energy generated in the power generation cell to an outside being electrically connected to the terminal plate, wherein
   the power output unit is electrically connected to an external connector through a joint part at a position above the cell stack body in the outer case, and the joint part comprises:
   a tightening member configured to tighten the power output unit and the external connector together by screw tightening; and
   a cover configured to cover a screw tightening part of the tightening member from below,
   wherein the cover is disposed at a position facing the cell stack body, inside the outer case.

2. The fuel cell system according to claim 1, wherein
   the external connector is positioned outside the outer case,
   the joint part includes an electrically conductive member inserted into an opening formed in an upper wall of the outer case, the upper wall being positioned above the cell stack body, and the tightening member applies a tightening force between the power output unit and the external connector in a manner that the electrically conductive member is held between the power output unit and the external connector.

3. The fuel cell system according to claim 1, wherein the cover is provided to the power output unit in a state where the cover is positioned below the power output unit.

4. The fuel cell system according to claim 3, wherein
the power output unit comprises an extension part extending in the stacking direction from an end side of the cell stack body toward an inside in the stacking direction of the cell stack body, and
the cover has an engagement part configured to engage both sides of the extension part in a width direction.

5. The fuel cell system according to claim 4, wherein the engagement part has a claw shape which is deformed elastically.

6. The fuel cell system according to claim 4, wherein a seal member is provided between the cover and the extension part.

7. The fuel cell system according to claim 6, wherein the seal member comprises a porous elastic seal member.

8. The fuel cell system according to claim 1, wherein the tightening member comprises:
a nut fixed to the power output unit; and
a bolt screwed with the nut to tighten the external connector downward.

9. The fuel cell system according to claim 4, wherein the cover comprises:
a base extending in the width direction of the extension part; and
a receiver provided to the base and forming a space accommodating part of the tightening member, and
the engagement part is provided at an end of the base in a direction in which the base extends.

10. The fuel cell system according to claim 9, wherein the receiver comprises:
a circumferential wall protruding downward from the base; and
a bottom wall provided at a lower end of the circumferential wall.

11. A fuel cell system comprising:
a cell stack body comprising a plurality of power generation cells stacked together in a stacking direction, the power generation cells each including a membrane electrode assembly and a separator;
an outer case configured to cover the cell stack body; and
a terminal plate provided at an end of the cell stack body in the stacking direction,
a power output unit configured to collect electrical energy generated in the power generation cell to an outside being electrically connected to the terminal plate, wherein
the power output unit is electrically connected to an external connector through a joint part at a position above the cell stack body in the outer case,
the joint part comprises:
a tightening member configured to tighten the power output unit and the external connector together by screw tightening; and
a cover configured to cover a screw tightening part of the tightening member from below,
the cover is provided to the power output unit in a state where the cover is positioned below the power output unit,
the power output unit comprises an extension part extending in the stacking direction from an end side of the cell stack body toward an inside in the stacking direction of the cell stack body, and
the cover has an engagement part configured to engage both sides of the extension part in a width direction.

12. The fuel cell system according to claim 11, wherein
the external connector is positioned outside the outer case,
the joint part includes an electrically conductive member inserted into an opening formed in an upper wall of the outer case, the upper wall being positioned above the cell stack body, and
the tightening member applies a tightening force between the power output unit and the external connector in a manner that the electrically conductive member is held between the power output unit and the external connector.

13. The fuel cell system according to claim 11, wherein the engagement part has a claw shape which is deformed elastically.

14. The fuel cell system according to claim 11, wherein a seal member is provided between the cover and the extension part.

15. The fuel cell system according to claim 14, wherein the seal member comprises a porous elastic seal member.

16. The fuel cell system according to claim 11, wherein the tightening member comprises:
a nut fixed to the power output unit; and
a bolt screwed with the nut to tighten the external connector downward.

17. The fuel cell system according to claim 11, wherein the cover comprises:
a base extending in the width direction of the extension part; and
a receiver provided to the base and forming a space accommodating part of the tightening member, and
the engagement part is provided at an end of the base in a direction in which the base extends.

18. The fuel cell system according to claim 17, wherein the receiver comprises:
a circumferential wall protruding downward from the base; and
a bottom wall provided at a lower end of the circumferential wall.

19. The fuel cell system according to claim 11, wherein the cover is disposed at a position facing the cell stack body.

* * * * *